United States Patent
Huang et al.

(10) Patent No.: US 7,444,215 B2
(45) Date of Patent: Oct. 28, 2008

(54) MOVING APPARATUS AND METHOD OF SELF-DIRECTION TESTING AND SELF-DIRECTION CORRECTION THEREOF

(75) Inventors: Hsuan-Kuan Huang, Taipei County (TW); Hung-Hsiu Yu, Changhua County (TW); Wei-Han Wang, Taipei County (TW); Ching-Yi Liu, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/757,414

(22) Filed: Jun. 4, 2007

(65) Prior Publication Data
US 2008/0172150 A1    Jul. 17, 2008

(30) Foreign Application Priority Data
Dec. 29, 2006    (TW) .............................. 95149969 A

(51) Int. Cl.
*G01C 22/00* (2006.01)
(52) U.S. Cl. ................... 701/23; 701/1; 701/2; 701/29; 701/32; 701/33; 701/34; 701/36; 701/37; 702/183; 706/15
(58) Field of Classification Search ............. 701/1, 701/2, 29, 32, 33, 34, 36, 37, 45, 200; 702/183; 706/15; 280/735
See application file for complete search history.

(56) References Cited

U.S. PATENT DOCUMENTS

| 4,937,945 | A | 7/1990 | Schofield et al. |
| 7,089,099 | B2* | 8/2006 | Shostak et al. ................ 701/32 |
| 7,103,460 | B1* | 9/2006 | Breed .......................... 701/29 |
| 7,243,945 | B2* | 7/2007 | Breed et al. .................. 280/735 |
| 2005/0273218 | A1* | 12/2005 | Breed et al. ..................... 701/2 |
| 2006/0025897 | A1* | 2/2006 | Shostak et al. ................. 701/1 |
| 2006/0212194 | A1* | 9/2006 | Breed .......................... 701/29 |
| 2008/0086240 | A1* | 4/2008 | Breed ........................... 701/1 |

* cited by examiner

*Primary Examiner*—Khoi H. Tran
*Assistant Examiner*—McDieunel Marc
(74) *Attorney, Agent, or Firm*—Jianq Chyun IP Office

(57) ABSTRACT

A moving apparatus has a body, and has at least a pair of wheels, a control unit, a direction measuring unit and at least a pair of encoders installed on the body. The direction measuring unit coupled to the control unit measures the direction of the body, and the control unit obtains a first direction variation according to the direction information. The pair of encoders coupled to the control unit measure a speed of the pair of wheels, and the control unit obtains a second direction variation according to information of the speed. The control unit compares the first and second direction variations to determine whether the direction measuring unit is temporarily dysfunction. Based on the result of comparison, the control unit applies the information provided by the direction measuring unit or the pair of encoders to obtain the current direction of the body.

12 Claims, 5 Drawing Sheets

MOVING APPARATUS AND METHOD OF SELF-DIRECTION TESTING AND SELF-DIRECTION CORRECTION THEREOF

CROSS-REFERENCE TO RELATED APPLICATION

This application claims the priority benefit of Taiwan application serial no. 95149969, filed on Dec. 29, 2006. All disclosure of the Taiwan application is incorporated herein by reference.

BACKGROUND OF THE INVENTION

1. Field of the Invention

The present invention relates to a moving apparatus. More particularly, the present invention relates to a moving apparatus and a method of self-direction testing and self-direction correction thereof.

2. Description of Related Art

In order to enable a moving apparatus to change its current direction to a target direction, various direction navigation technologies have been developed and applied in the moving apparatus. The moving apparatus mentioned herein refers to a robot that moves by wheels without a fixed track, such as, an automobile, a security robot that is capable of going on patrol automatically, and a vacuum cleaner robot that is capable of cleaning a room automatically.

The current direction navigation technology determines the current direction of the moving apparatus based on the direction information provided by an electronic compass installed on the moving apparatus. However, with regard to the moving apparatus using the electronic compass for direction navigation, it is an unavoidable problem that a magnetic field of a surrounding environment causes interferences to the electronic compass, thereby affecting the accuracy and reliability of the direction navigation of the moving apparatus, and thus possibly causing unexpected accidents or damages.

Considering the current solution to the problem that the direction navigation of the electronic compass is inaccurate due to the magnetic field interference, another direction measuring unit free from the magnetic field interference, e.g., a gyroscope or an optical encoder, is usually adopted to form a double-feedback system for the direction navigation data of the moving apparatus, together with the electronic compass. However, although the assistant direction measuring unit may correct a direction signal for the electronic compass, the gyroscope causes an additional cost, and the optical encoder not only increases the cost, but also it is complicated for being designed and integrated into the electronic compass.

SUMMARY OF THE INVENTION

The present invention provides a moving apparatus with self-direction testing and self-direction correction functions.

The present invention provides a method of self-direction testing and self-direction correction, applicable for a moving apparatus to enhance the accuracy and reliability of direction navigation.

The present invention provides a moving apparatus having the functions of self-direction testing and self-direction correction, which includes a body, at least one pair of wheels, a control unit, a direction measuring unit, and at least one pair of encoders. The pair of the wheels is installed on the body for changing a direction of the body. The control unit is installed on the body. The direction measuring unit is installed on the body and coupled to the control unit, for measuring the direction of the body and transmitting direction information to the control unit for obtaining a first direction variation of the body according to the direction information. The pair of the encoders is installed on the body and coupled to the control unit, for measuring a speed of the pair of the wheels respectively and transmitting information of the speed to the control unit for obtaining a second direction variation according to the information of the speed. During a process of changing a current direction of the body to a target direction through the pair of the wheels, the control unit determines whether the direction measuring unit is temporarily dysfunction by comparing the first direction variation with the second direction variation. If the direction measuring unit is determined to be normal, the control unit obtains the current direction of the body according to the direction information provided by the direction measuring unit, and if the direction measuring unit is determined to be abnormal, the control unit obtains the current direction of the body according to information of the speed provided by the pair of the encoders.

The method of self-direction testing and self-direction correction provided by the present invention is applicable for a moving apparatus, which includes the following steps: (1) changing the current direction of a body of the moving apparatus to a target direction through a pair of wheels of the moving apparatus according to a direction-changing instruction; (2) during the process of changing the current direction of the body to the target direction through the pair of the wheels, obtaining a first direction variation of the body in a predetermined cycle through a direction measuring unit of the moving apparatus, and measuring a speed of the pair of the wheels respectively through a pair of encoders of the moving apparatus, so as to obtain a second direction variation of the body in the predetermined cycle; (3) comparing the first direction variation with the second direction variation to determine whether the direction measuring unit is temporarily dysfunction, in which if the direction measuring unit is determined to be normal, the current direction of the body is obtained according to the direction information provided by the direction measuring unit, and if the direction measuring unit is determined to be abnormal, the current direction of the body is obtained according to information of the speed provided by the pair of the encoders; (4) if the current direction of the body is obtained according to the direction information provided by the direction measuring unit, determining whether the current direction of the body is changed to the target direction, in which if the current direction of the body has not been changed to the target direction, Steps (2)-(3) are repeated, and if the current direction of the body has already been changed to the target direction, the pair of the wheels stop changing the current direction of the body; and (5) if the current direction of the body is obtained according to information of the speed provided by the pair of the encoders, determining whether the current direction of the body is changed to the target direction, in which if the current direction of the body has not been changed to the target direction, the current direction of the body continues to be obtained according to information of the speed of the encoders, and the pair of the wheels will not stop changing the current direction until the current direction is changed to the target direction.

In the present invention, since whether the direction measuring unit is temporarily dysfunction is determined according to information of the speed provided by the encoders originally installed on the body to measure the wheel speed, the accuracy and reliability of the direction navigation of the moving apparatus can be improved through changing the internal arithmetic logic of the controller, without adding any new hardware devices or changing the existing hardware design architecture. Therefore, the present invention has the advantages of reducing the cost and simplifying the design.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
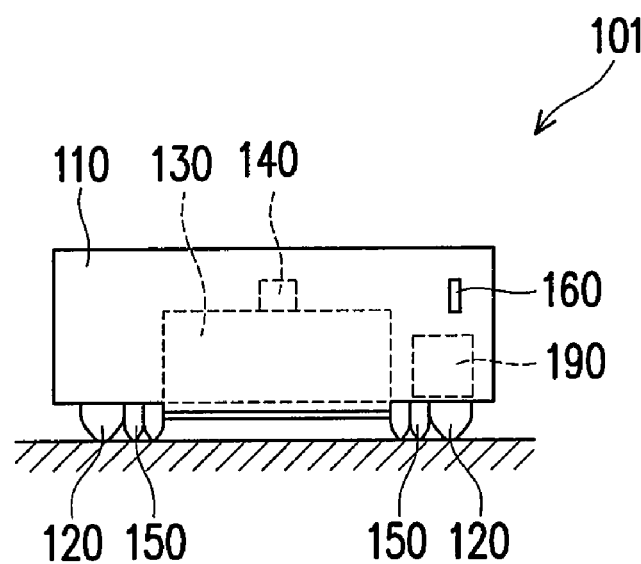
FIG. 1 is a side view of a moving apparatus according to an embodiment of the present invention.
Figure 2:
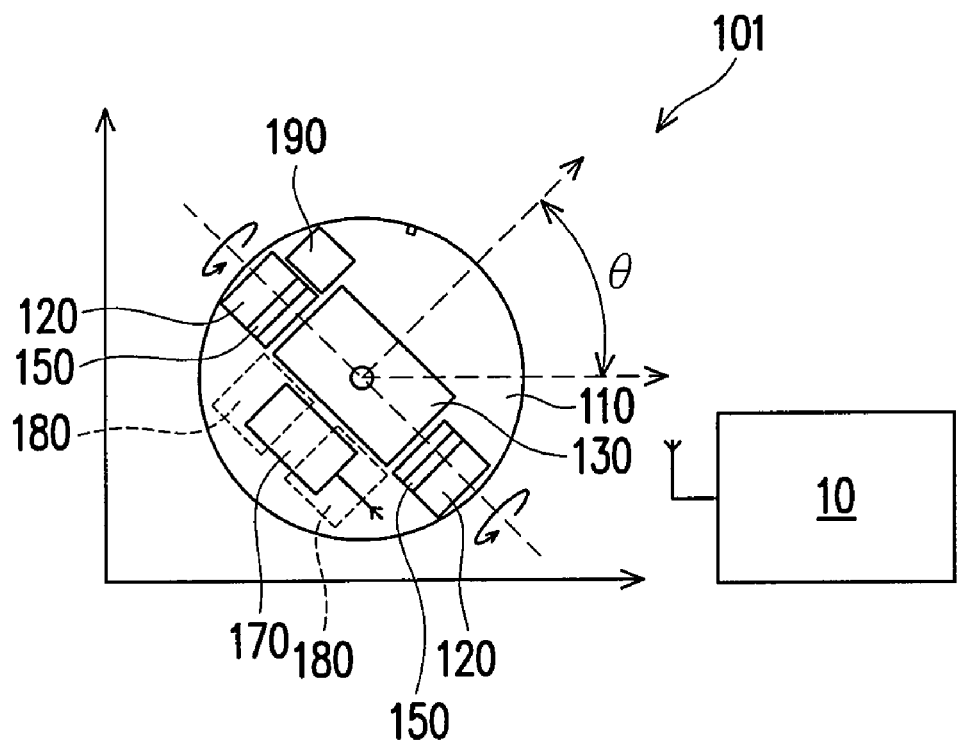
FIG. 2 is a top view of the moving apparatus in FIG. 1.
Figure 3:
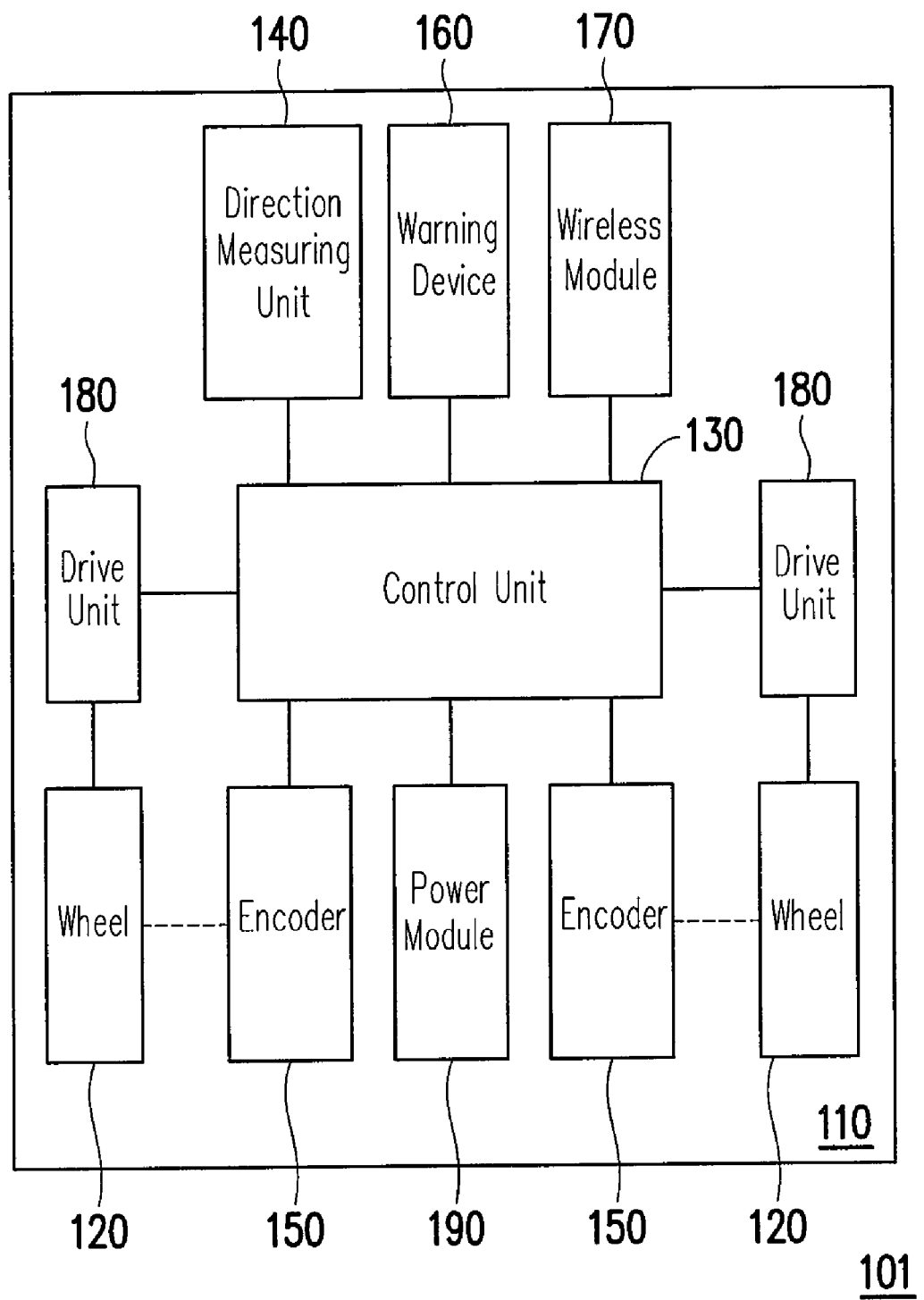
FIG. 3 is a block diagram of the moving apparatus in FIG. 1.

FIG. 1 is a side view of a moving apparatus according to an embodiment of the present invention, FIG. 2 is a top view of the moving apparatus in FIG. 1, and FIG. 3 is a block diagram of the moving apparatus in FIG. 1. Referring to FIGS. 1 to 3, the moving apparatus 101 in this embodiment includes a body 110 and a pair of wheels 120. The pair of the wheels 120 is installed on the body 110, for changing a direction of the body 110 and moving the body 110.

The moving apparatus 101 further includes a control unit 130 installed on the body 110. The moving apparatus 101 further includes a direction measuring unit 140 installed on the body 110 and coupled to the control unit 130, for measuring direction information of the body 110 and transmitting the direction information to the control unit 130, such that the control unit 130 obtains a first direction variation of the body 110 according to the direction information. In this embodiment, the direction measuring unit 140 may be an electronic compass or a gyroscope.

The moving apparatus 101 further includes a pair of encoders 150 installed on the body 110 and coupled to the control unit 130, for measuring a speed of the pair of the wheels 120 respectively and transmitting information of the speed to the control unit 130, such that the control unit 130 obtains a second direction variation of the body 110 according to information of the speed, such as the rotating speed difference of the pair of the wheels 120.

When the control unit 130 receives a direction-changing instruction, the current direction of the body 110 is changed to a target direction corresponding to the direction-changing instruction through the pair of the wheels 120. During the process of changing the current direction of the body 110 to the target direction through the pair of the wheels 120, the control unit 130 determines whether the direction measuring unit 140 is temporarily dysfunction by comparing the first direction variation with the second direction variation.

Therefore, if the direction measuring unit 140 is determined to be normal, the control unit 130 obtains the current direction of the body 110 according to the direction information measured by the direction measuring unit 140. On the contrary, if the direction measuring unit 140 is determined to be abnormal, the control unit 130 obtains the current direction of the body 110 according to information of the speed measured by the pair of the encoders 150.

In this embodiment, the process for the control unit 130 to compare the first direction variation with the second direction variation may be by determining whether an absolute value of a difference between the first direction variation and the second direction variation is greater than a predetermined value. If the absolute value of the difference between the first direction variation and the second direction variation is greater than the predetermined value, the control unit 130 determines that the direction measuring unit 140 information of the speed. On the contrary, if the absolute value of the difference between the first direction variation and the second direction variation is smaller than the predetermined value, the control unit 130 determines that the direction measuring unit 140 is normal.

The moving apparatus 101 further includes a warning device 160 installed on the body 110 and coupled to the control unit 130. If the direction measuring unit 140 is determined to be abnormal, the control unit 130 outputs a signal to the warning device 160, such that the warning device 160 sends out a warning message, so as to warn a user at a close distance. The warning message is, for example, sound or light.

The moving apparatus 101 further includes a wireless module 170 installed on the body 110 and coupled to the control unit 130. If the direction measuring unit 140 is determined to be abnormal, the control unit 130 outputs a signal to the wireless module 170, such that the wireless module 170 sends out a wireless warning signal to a remote monitoring interface 10, so as to warn the user remotely.

The moving apparatus 101 further includes a pair of drive units 180 installed on the body 110 and coupled to the control unit 130, for driving the pair of the wheels 120 respectively. The pair of the drive units 180 has an independent power source respectively, or shares a common power source. Furthermore, the moving apparatus 101 further includes a power module 190 installed on the body 110, for supplying electric power to elements requiring the power.

Figure 4:
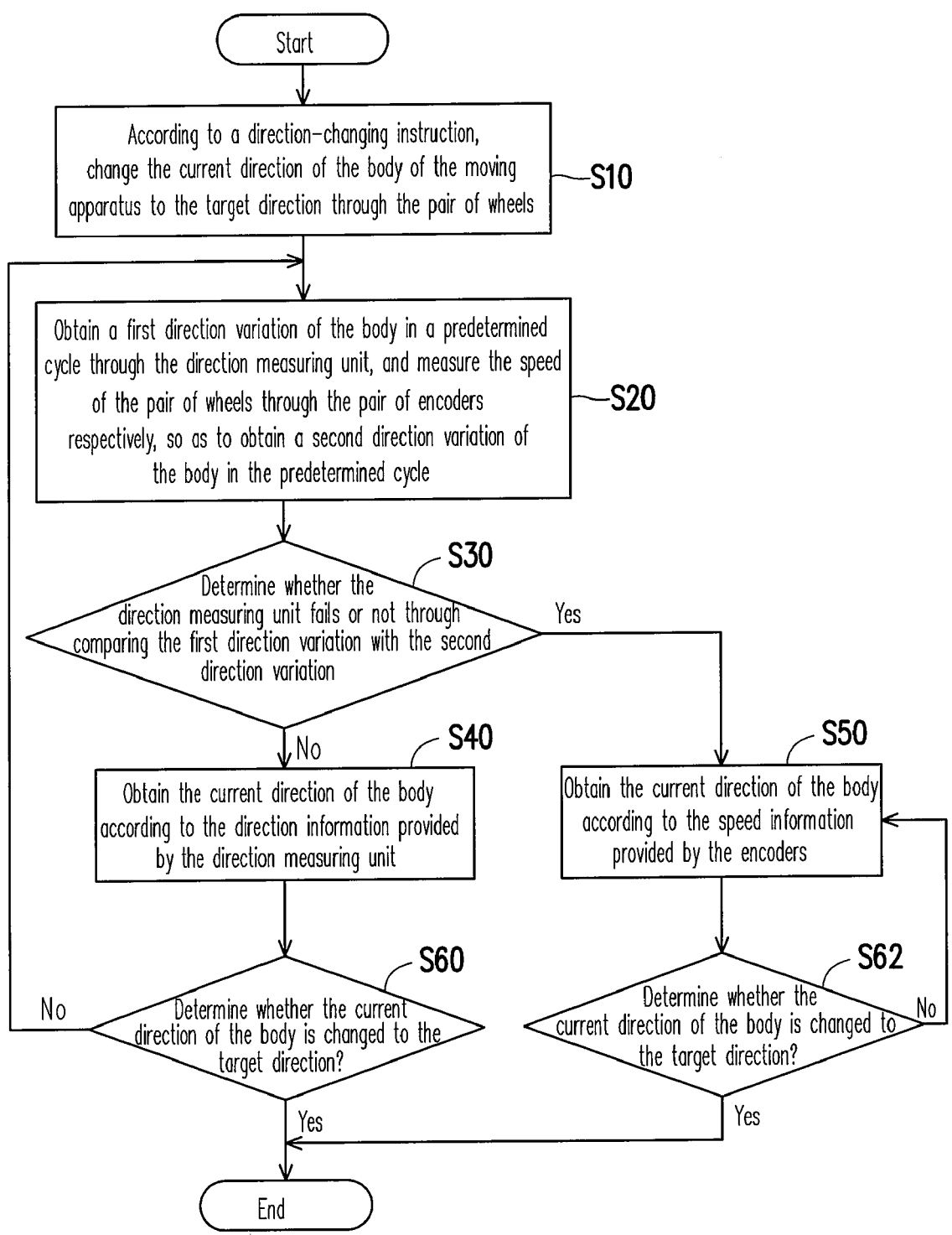
FIG. 4 is a flow chart of the process for applying the moving apparatus in FIG. 1 of the present invention.

FIG. 4 is a flow chart of a method of self-direction testing and self-direction correction applied in the moving apparatus in FIG. 1 of the present invention. Referring to FIGS. 1 to 4, the present invention provides a method of self-direction testing and self-direction correction applicable for the moving apparatus in FIG. 1, which is used for enhancing the accuracy and reliability of the direction navigation.

As shown in Step S10, the control unit 130 changes the current direction of the body 110 to a target direction through the pair of the wheels 120 according to a direction-changing instruction. In Step S10, the control unit 130 drives the pair of the wheels 120 respectively by the pair of the drive units 180, so as to change the direction of the body 110.

As shown in Step S20, during the process of changing the current direction of the body 110 to the target direction through the pair of the wheels 120, the control unit 130 obtains a first direction variation of the body 110 in a predetermined cycle through a direction measuring unit 140, and the control unit 130 measures the speed of the pair of the wheels 120 respectively through the pair of the encoders 150, so as to obtain a second direction variation of the body 110 in the predetermined cycle.

As shown in Step S30, the control unit 130 determines whether the direction measuring unit is temporarily dysfunction by comparing the first direction variation with the second direction variation. In Step S30, the step of comparing the first direction variation with the second direction variation may be by determining whether the absolute value of a difference between the first direction variation and the second direction variation is greater than a predetermined value. Then, if the absolute value of the difference between the first direction variation and the second direction variation is greater than the predetermined value, the control unit 130 determines that the direction measuring unit 140 is temporarily dysfunction. On the contrary, if the absolute value of the difference between the first direction variation and the second direction variation is smaller than the predetermined value, the control unit 130 determines that the direction measuring unit 140 is normal.

As shown in Step S40, when the direction measuring unit 140 is determined to be normal by the control unit 130, the control unit 130 obtains the current direction of the body 110 according to the direction information provided by the direction measuring unit 140.

As shown in Step S50, when the direction measuring unit 140 is determined to be abnormal by the control unit 130, the control unit 130 obtains the current direction of the body 110 according to information of the speed provided by the pair of the encoders 150. Furthermore, a warning message may be sent out by the warning device 160, so as to warn the user at a close distance, or a wireless warning signal may be further sent to a remote monitoring interface 10 through the wireless module 170, so as to warn the user remotely.

As shown in Step S60, when the control unit 130 obtains the current direction of the body 110 according to the direction information provided by the direction measuring unit 140, the control unit 130 determines whether the current direction of the body 110 is changed to the target direction. If the current direction of the body 110 has not been changed to the target direction, return to Step S20. On the contrary, if the current direction of the body 110 has already been changed to the target direction, the pair of the wheels 120 stop changing the current direction of the body 110.

As shown in Step S62, when the control unit 130 obtains the current direction of the body 110 according to information of the speed provided by the pair of the encoders 150, the control unit 130 determines whether the current direction of the body 110 is changed to the target direction. If the current direction of the body 110 has not been changed to the target direction, return to Step S50. On the contrary, if the current direction of the body 110 has already been changed to the target direction, the pair of the wheels 120 stop changing the current direction of the body 110.

Figure 5:
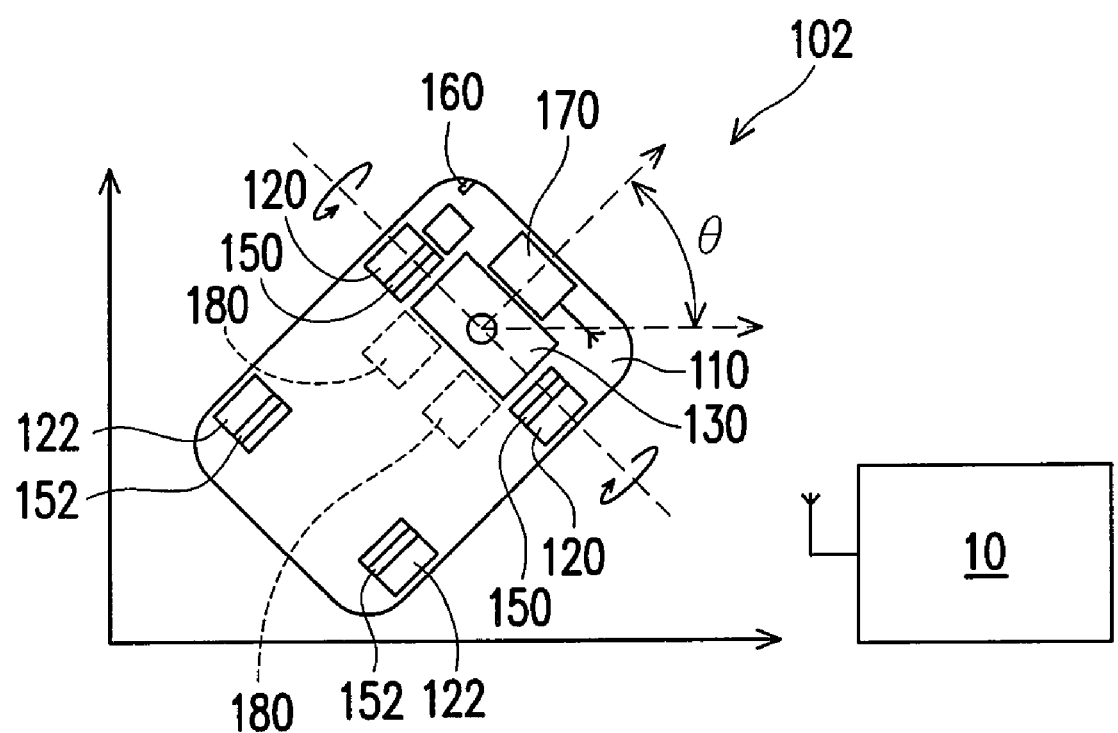
FIG. 5 is a top view of a moving apparatus according to another embodiment of the present invention.
Figure 6:
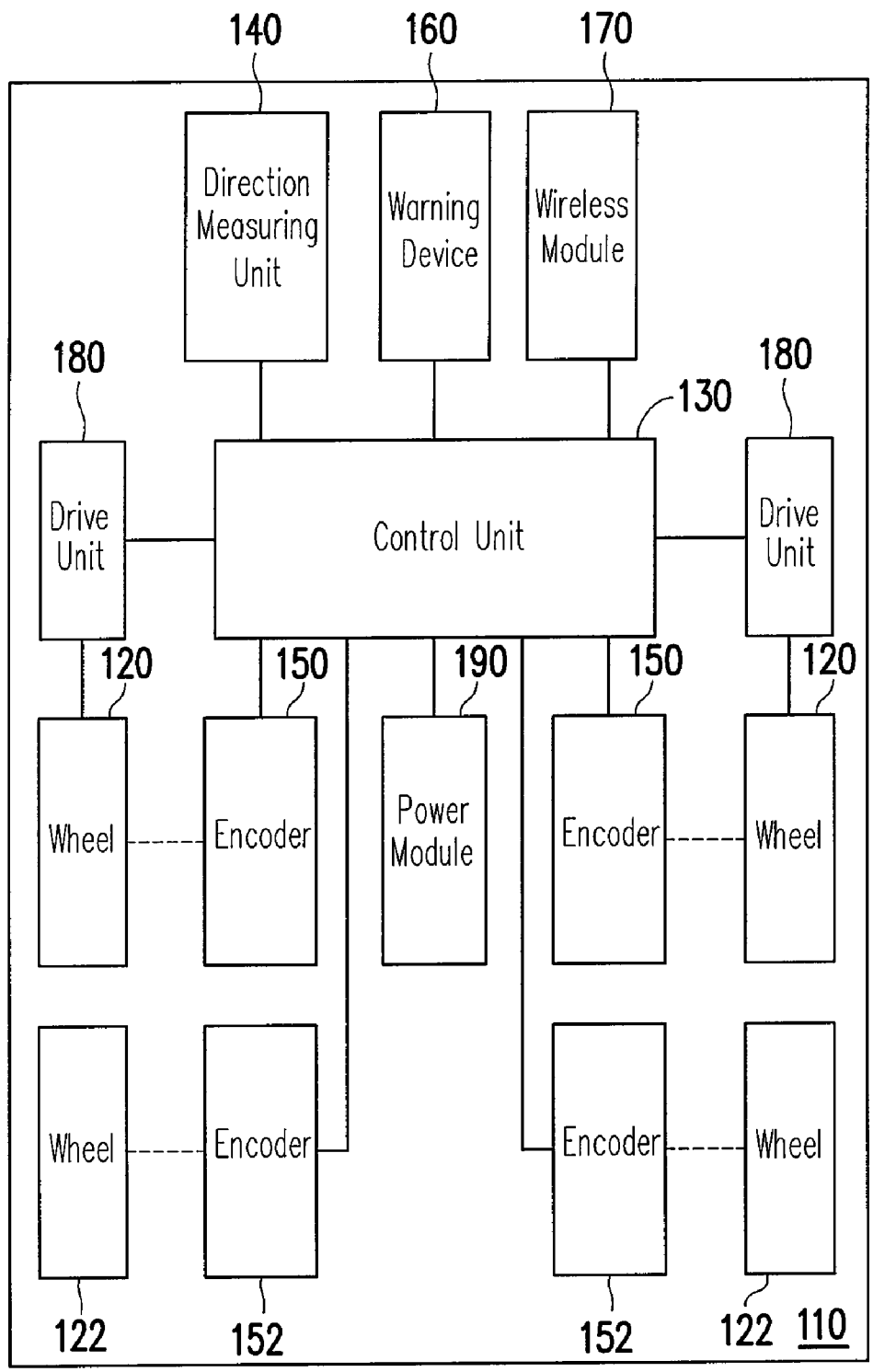
FIG. 6 is a block diagram of the moving apparatus in FIG. 5.

FIG. 5 is a top view of a moving apparatus according to another embodiment of the present invention, and FIG. 6 is a block diagram of the moving apparatus in FIG. 5. Referring to FIGS. 5 and 6, compared with the moving apparatus 101 of the embodiment shown in FIG. 2, the moving apparatus 102 of the second embodiment further includes another pair of wheels 122 and another pair of encoders 152. The pair of the wheels 122 is installed on the body 110. The pair of encoders 152 is installed on the pair of the wheels 122 and coupled to the control unit 130, for measuring the speed of the pair of the wheels 122 respectively and transmitting information of the speed to the control unit 130. Therefore, the control unit 130 may also obtain a second direction variation of the body 110 with reference to information of the speed of the pair of the wheels 122 measured by the pair of the encoders 152.

In view of the above, in the present invention, a direction variation is obtained according to the direction information provided by the direction measuring unit, another direction variation is obtained according to the speed of the pair of the wheels measured by the pair of the encoders respectively, and then the two direction variations are compared to determine whether the direction measuring unit is temporarily dysfunction.

If the direction measuring unit is normal, the current direction of the body is obtained according to the direction information of the direction measuring unit; and if the direction measuring unit is abnormal, the current direction of the body is obtained according to information of the speed of the pair of the wheels provided by the pair of the encoders respectively.

In the present invention, since whether the direction measuring unit is temporarily dysfunction is determined according to information of the speed provided by the encoders originally installed on the body to measure the wheel speed, the accuracy and reliability of the direction navigation of the moving apparatus can be improved through changing the internal arithmetic logic of the controller, without adding any new hardware devices or changing the existing hardware design architecture. Therefore, the present invention has the advantages of reducing the cost and simplifying the design.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A moving apparatus, having self-direction testing and self-direction correction functions, comprising:
   a body;
   at least one pair of wheels, installed on the body, for changing a direction of the body;
   a control unit, installed on the body;
   a direction measuring unit, installed on the body and coupled to the control unit, for measuring the direction of the body and transmitting direction information to the control unit for obtaining a first direction variation of the body according to the direction information; and
   at least one pair of encoders, installed on the body and coupled to the control unit, for measuring a speed of the pair of the wheels respectively and transmitting information of the speed to the control unit for obtaining a second direction variation of the body according to the information of the speed, wherein during a process of changing a current direction of the body to a target direction through the pair of the wheels, the control unit determines whether the direction measuring unit is temporarily dysfunction by comparing the first direction variation with the second direction variation, wherein
      if the direction measuring unit is determined to be normal, the control unit obtains the current direction of the body according to the direction information provided by the direction measuring unit, and
      if the direction measuring unit is determined to be abnormal, the control unit obtains the current direction of the body according to the information of the speed provided by the pair of the encoders.

2. The moving apparatus as claimed in claim 1, wherein the direction measuring unit is an electronic compass or a gyroscope.

3. The moving apparatus as claimed in claim 1, wherein the process of comparing the first direction variation with the second direction variation is by determining whether an absolute value of a difference between the first direction variation and the second direction variation is greater than a predetermined value.

4. The moving apparatus as claimed in claim 1, further comprising:
   a warning device, installed on the body and coupled to the control unit, wherein when the direction measuring unit is determined to be abnormal, the control unit outputs a signal to the warning device for sending out a warning message.

5. The moving apparatus as claimed in claim 1, further comprising:
   a wireless module, installed on the body and coupled to the control unit, wherein when the direction measuring unit is determined to be abnormal, the control unit outputs a signal to the wireless module for sending out a wireless warning signal to a remote monitoring interface.

6. The moving apparatus as claimed in claim 1, further comprising:
   a pair of drive units, installed on the body and coupled to the control unit, for driving the pair of the wheels respectively.

7. A method of self-direction testing and self-direction correction, applicable for a moving apparatus, comprising:
   (1) changing a current direction of a body of the moving apparatus to a target direction through a pair of wheels of the moving apparatus according to a direction-changing instruction;
   (2) during the process of changing the current direction of the body to the target direction through the pair of the wheels, obtaining a first direction variation of the body in a predetermined cycle through a direction measuring unit of the moving apparatus, and measuring a speed of the pair of the wheels respectively through a pair of encoders of the moving apparatus, so as to obtain a second direction variation of the body in the predetermined cycle;
   (3) comparing the first direction variation with the second direction variation to determine whether the direction measuring unit is temporarily dysfunction, wherein
      if the direction measuring unit is determined to be normal, the current direction of the body is obtained according to direction information provided by the direction measuring unit, and
      if the direction measuring unit is determined to be abnormal, the current direction of the body is obtained according to information of the speed provided by the pair of the encoders;
   (4) if the current direction of the body is obtained according to the direction information provided by the direction measuring unit, determining whether the current direction of the body is changed to the target direction, wherein
      if the current direction of the body has not been changed to the target direction, Steps (2)-(3) are repeated, and
      if the current direction of the body has already been changed to the target direction, the pair of the wheels stop changing the current direction of the body; and
   (5) if the current direction of the body is obtained according to information of the speed provided by the pair of the encoders, determining whether the current direction of the body is changed to the target direction, wherein if the current direction of the body has not changed to the target direction, the current direction of the body continues to be obtained according to information of the speed of the encoders, and the pair of the wheels do not stop changing the current direction until the current direction is changed to the target direction.

8. The method of self-direction testing and self-direction correction as claimed in claim 7, wherein the direction measuring unit employs an electronic compass or a gyroscope.

9. The method of self-direction testing and self-direction correction as claimed in claim 7, wherein the step of comparing the first direction variation with the second direction variation is by determining whether an absolute value of a difference between the first direction variation and the second direction variation is greater than a predetermined value.

10. The method of self-direction testing and self-direction correction as claimed in claim 7, further comprising:
    if the direction measuring unit is determined to be abnormal, sending out a warning message by a warning device of the moving apparatus.

11. The method of self-direction testing and self-direction correction as claimed in claim 7, further comprising:
    if the direction measuring unit is determined to be abnormal, sending a wireless warning signal to a remote monitoring interface by a wireless module of the moving apparatus.

12. The method of self-direction testing and self-direction correction as claimed in claim 7, wherein the step of changing a direction of the body through the pair of the wheels is by driving the pair of the wheels respectively through a pair of drive units of the moving apparatus to change the direction of the body.

* * * * *